(12) United States Patent
Koshimizu et al.

(10) Patent No.: US 11,304,112 B2
(45) Date of Patent: Apr. 12, 2022

(54) ANCHOR POINT CONTROL DEVICE AND ANCHOR POINT CONTROL METHOD

(71) Applicant: NTT DOCOMO, INC., Tokyo (JP)

(72) Inventors: Takashi Koshimizu, Tokyo (JP); Irfan Ali, Istanbul (TR); Syed Husain, Chicago, IL (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/099,932

(22) PCT Filed: May 11, 2017

(86) PCT No.: PCT/JP2017/017778
§ 371 (c)(1),
(2) Date: Nov. 8, 2018

(87) PCT Pub. No.: WO2017/195851
PCT Pub. Date: Nov. 16, 2017

(65) Prior Publication Data
US 2019/0141599 A1 May 9, 2019

(30) Foreign Application Priority Data
May 11, 2016 (JP) .............................. JP2016-095118

(51) Int. Cl.
*H04W 36/32* (2009.01)
*H04W 88/14* (2009.01)
*H04W 40/18* (2009.01)
*H04W 36/08* (2009.01)

(52) U.S. Cl.
CPC ........... *H04W 36/32* (2013.01); *H04W 36/08* (2013.01); *H04W 40/18* (2013.01); *H04W 88/14* (2013.01)

(58) Field of Classification Search
None
See application file for complete search history.

(56) References Cited

U.S. PATENT DOCUMENTS

| 2004/0072569 | A1 | 4/2004 | Omae et al. | |
| 2011/0134880 | A1* | 6/2011 | Ait-Ameur | H04W 36/0016 370/331 |

(Continued)

FOREIGN PATENT DOCUMENTS

| JP | 2004/129165 A | 4/2004 |
| JP | 2009027478 A | 2/2009 |

(Continued)

OTHER PUBLICATIONS

Ericsson; "Mobility on Demand architecture aspects"; SA WG2 Meeting #114 S2-161471; Sophia-Antipolis, France, Apr. 11-15, 2016 (4 pages).

(Continued)

*Primary Examiner* — Saumit Shah
(74) *Attorney, Agent, or Firm* — Osha Bergman Watanabe & Burton LLP

(57) ABSTRACT

Provided are an anchor point control device and an anchor point control method that make it possible to select a more suitable anchor point when dynamically changing an anchor point (route switching point). An ME (300) acquires user information indicating at least either an attribute or a state of UE (100), and selects an anchor point out of an anchor point AL and an anchor point AC based on the acquired user information. In addition, the ME (300) notifies the UE 100 of the selected anchor point.

3 Claims, 9 Drawing Sheets

(56) References Cited

U.S. PATENT DOCUMENTS

| | | | |
|---|---|---|---|
| 2012/0026884 A1* | 2/2012 | Sundell | H04W 8/065 370/235 |
| 2012/0214492 A1* | 8/2012 | Mihaly | H04W 76/22 455/437 |
| 2013/0208659 A1* | 8/2013 | Nishida | H04W 8/22 370/328 |
| 2014/0023038 A1* | 1/2014 | Venkatachalam | H04W 8/085 370/331 |
| 2015/0156660 A1 | 6/2015 | Luo | |
| 2015/0327163 A1 | 11/2015 | Pack et al. | |
| 2016/0037411 A1 | 2/2016 | Franklin et al. | |
| 2017/0289270 A1* | 10/2017 | Li | H04L 41/12 |

FOREIGN PATENT DOCUMENTS

| | | |
|---|---|---|
| JP | 2012054620 A | 3/2012 |
| WO | 2014118761 A1 | 8/2014 |

OTHER PUBLICATIONS

3GPP TR 23.799 V0.3.3; "3rd Generation Partnership Project; Technical Specification Group Services and System Aspects; Study on Architecture for Next Generation System (Release 14)"; Mar. 2016 (52 pages).
3GPP TR 23.714 V0.3.0; "3rd Generation Partnership Project; Technical Specification Group Services and System Aspects; Study on control and user plane separation of EPC nodes (Release 14)"; Feb. 2016 (42 pages).
Ericsson; "Update to session establishment procedure"; SA WG2 Meeting #114 S2-161475; Sophia Antipolis, France, Apr. 11-15, 2016 (6 pages).
International Search Report issued for PCT/JP2017/017778, dated Aug. 1, 2017 (4 pages).
Written Opinion issued for PCT/JP2017/017778, dated Aug. 1, 2017 (7 pages).
Extended European Search Report issued in the counterpart European Patent Application No. 17796209.9, dated Nov. 11, 2019 (7 pages).
SA WG2 Meeting #114; S2-161697 "Solution for key issue 18: Interworking between the NextGen core and EPC" Samsung; Sophia Antipolis, France; Apr. 18-22, 2016 (8 pages).
Office Action issued in European Application No. 17796209.9; dated Nov. 18, 2020 (6 pages).
Office Action issued in Japanese Application No. 2018-517069, dated Apr. 22, 2021 (5 pages).
Notice of Reasons for Refusal issued in Japanese Application No. 2018-517069 dated Sep. 28, 2021 (6 pages).

* cited by examiner

ANCHOR POINT CONTROL DEVICE AND ANCHOR POINT CONTROL METHOD

TECHNICAL FIELD

The present invention relates to an anchor point control device and an anchor point control method for controlling an anchor point, which is a switching point of a route of user device at a handover.

BACKGROUND ART

3rd Generation Partnership Project (3GPP) specifies, with the aim of further speeding Long Term Evolution (LTE), LTE-Advanced (hereinbelow, the LTE includes the LTE-Advanced). Moreover, in the 3GPP, specification of succeeding systems of the LTE called 5G (5th generation mobile communication system) and the like is being considered.

In the discussion for this succeeding system, there has been proposed an idea of a handover of user device (UE) by dynamically changing an anchor point, which is a switching point of the route established between the UE and a network side (for example, Non-Patent Literature 1). Specifically, it has been proposed to select an anchor point out of multiple anchor points provided in a radio access network (RAN) and a core network (CN).

PRIOR ART DOCUMENT

Non-Patent Document

Non-Patent Document 1: Mobility on Demand architecture aspects, SA WG2 Meeting #114, S2-161471, 3GPP, April 2016

SUMMARY OF THE INVENTION

However, dynamically changing an anchor point involves the following problem. That is, since the optimal anchor point changes from one to another depending on various conditions, it is not easy to always select the optimal anchor point. Specifically, the optimal anchor point can change depending on factors such as the usage of user equipment.

Hence, the present invention has been made in view of the above state, and an objective thereof is to provide an anchor point control device and an anchor point control method that make it possible to select a more suitable anchor point when dynamically changing an anchor point (route switching point).

An aspect of the present invention is an anchor point control device (ME 300) that controls a route switching point (anchor point AL, anchor point AC), which is a switching point of a route of user device (UE 100) at a handover, the anchor point control device including: an information acquisition section (information acquisition section 310) that acquires user information indicating at least either an attribute or a state of the user device; an anchor point selector (anchor point selector 320) that selects a route switching point out of multiple route switching points based on the user information acquired by the information acquisition section; and an anchor point notification section (anchor point notification section 330) that notifies the user device of the route switching point selected by the anchor point selector.

An aspect of the present invention is an anchor point control method for a control device that controls a route switching point, which is a switching point of a route of user device at a handover, the anchor point control method including the steps of: selecting a route switching point by the control device out of multiple route switching points based on user information indicating at least either an attribute or a state of the user device; and notifying the user device by the control device of the selected route switching point.

MODES FOR CARRYING OUT THE INVENTION

Next, an embodiment of the present invention will be described based on the drawings. Note that the same or similar reference signs denote the same or similar functions and structures, and descriptions thereof are omitted as appropriate.

(1) Overall Schematic Configuration of Radio Communication System

Figure 1:
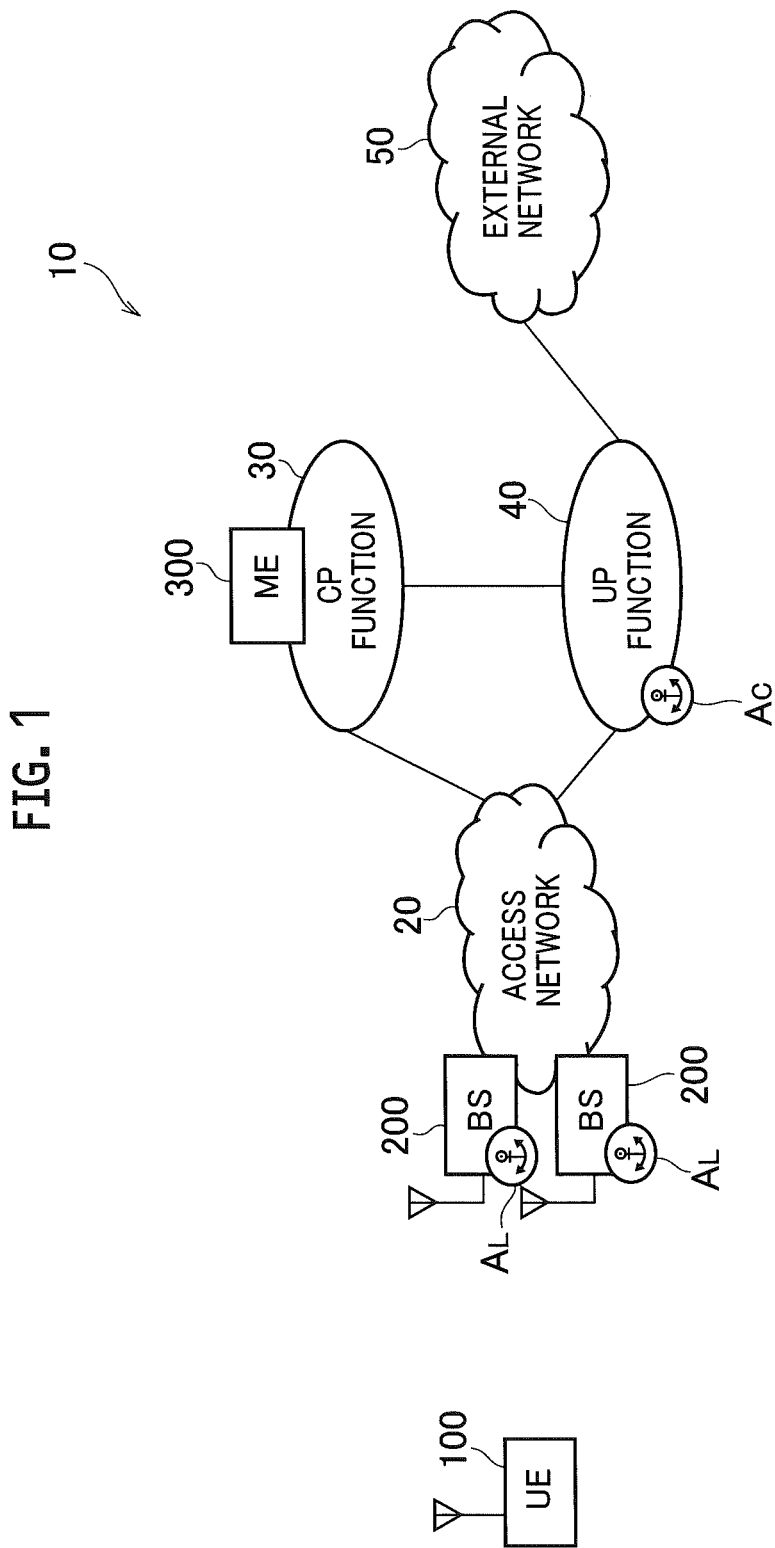
FIG. 1 is an overall schematic configuration diagram of a radio communication system 10.

FIG. 1 is an overall schematic configuration diagram of a radio communication system 10 according to the present embodiment. The radio communication system 10 conforms to "5G", which is the succeeding system of Long Term Evolution (LTE). Note that the radio communication system 10 may be referred to as future radio access (FRA) or a next generation system (NextGen).

As illustrated in FIG. 1, the radio communication system 10 includes a radio access network 20, a core network control plane function 30 (hereinafter, CP function 30), a core network user plane function 40 (hereinafter, UP function 40), and user device 100 (hereinafter, UE 100). In addition, an external network 50 is connected to the radio communication system 10, more specifically, to the UP function 40.

The radio access network 20, for example, conforms to radio access technology (RAT) specified in the 3rd Generation Partnership Project (3GPP), and includes radio base stations 200 (hereinafter, BSs 200).

The CP function 30 and the UP function 40 are connected to the radio access network 20. The CP function 30 and the UP function 40 provide a control plane function and a user plane function in the core network of the radio communication system 10. In other words, in the core network of the radio communication system 10, a configuration (CUPS: C/U plane separation) is employed in which the control plane function for controlling the UE 100, the BSs 200, and the like, and the user plane function for transmitting and receiving user data and the like are clearly separated. The CP function 30 and the UP function 40 each includes a serving gateway (SGW), a PDN gateway (PGW), a traffic detection function (TDF), and the like.

The external network 50 is connected to the UP function 40. Although a typical example of the external network 50 is the Internet, the type of the external network 50 is not particularly limited. The external network 50 may be a private network provided by the operator or the like of the radio communication system 10.

The UE 100 and the BSs 200 perform radio communication following a radio communication technique specified in the 3GPP. Specifically, in this embodiment, the UE 100 is capable of changing an anchor point (anchor points AL or an anchor point AC in FIG. 1) at a handover as appropriate based on control by the CP function 30.

A mobile control entity 300 (hereinafter, ME 300) is one of devices included in the CP function 30. In this embodiment, the ME 300 constitutes the anchor point control device.

The ME 300 dynamically controls an anchor point, which is a switching point of a route (which may be called a bearer, a session, or a connection) of the UE 100 at a handover. Specifically, the ME 300 is capable of dynamically changing an anchor point based on the mobility (moving speed, movement frequency, and other factors) of the UE 100, or the pattern of data (traffic) transmitted and received by the UE 100. Considering this function that the ME 300 provides, the ME 300 may be called On Demand Management Entity, for example.

(2) Functional Block Configuration of Radio Communication System

Next, descriptions will be provided for the functional block configuration of the radio communication system 10. Specifically, the functional block configuration of the ME 300 will be described.

Figure 2:
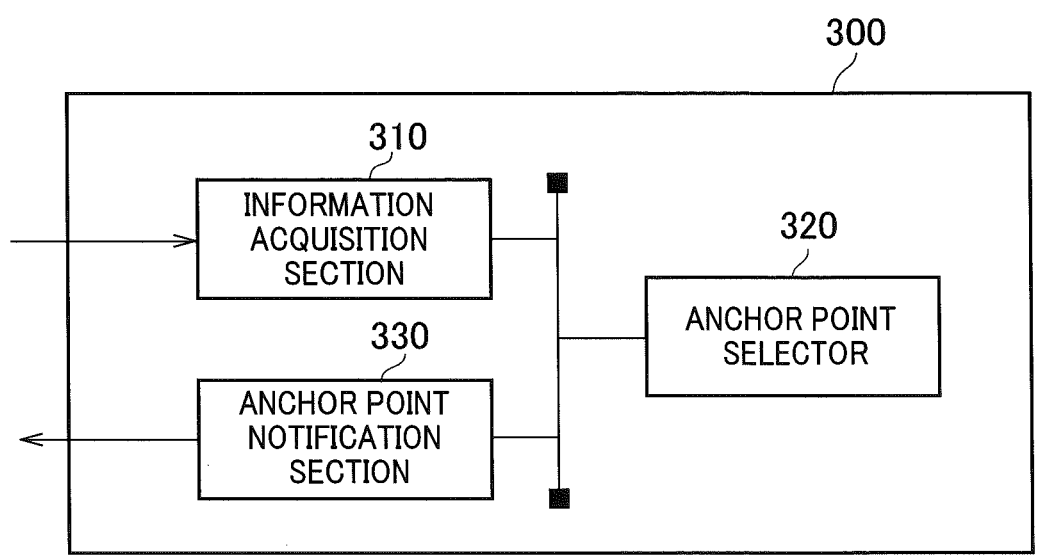
FIG. 2 is a functional block configuration diagram of an ME300.

FIG. 2 is a functional block diagram of the ME 300. As illustrated in FIG. 2, the ME 300 includes an information acquisition section 310, an anchor point selector 320, and an anchor point notification section 330. Note that the ME 300 is a device (entity) that manages the UE 100, and may have the same functions as a mobility management entity (MME) in LTE has.

The information acquisition section 310 acquires information (user information) on the UE 100 connected, specifically, attached, to the radio access network 20.

The user information indicates at least one of an attribute and a state of the UE 100. The attribute indicates a feature or a characteristic of the UE 100, which the UE 100 carries beforehand, or is required for the UE 100 in advance. Examples of the attribute include the type of the UE 100, the required quality of service (QoS), and the delay time (Latency).

The state indicates an appearance or circumstances of the UE 100, which can vary depending on the usage mode of the UE 100. Examples of the state include the movement frequency and the moving speed of the UE 100, and the traffic pattern of data transmitted and received by the UE 100. The type of the radio access network 20 to which the UE 100 is connected (attached) and the type of a core network provided by the UP function 40 are included in the state of the UE 100.

As described above, the information acquisition section 310 is capable of acquiring mobility information indicating the mobility of the UE 100, such as the movement frequency and the moving speed of the UE 100.

The movement frequency means a count of movements of the UE 100 at specified timings (for example, every one minute) within a specified time (for example, one hour) instead of stopping at a certain point. The movement frequency may be indicated by a probability, or by a count (times) of movements at those timings. The moving speed is a moving distance per unit time, and can be indicated by km/h, m/s, or the like.

As described above, the information acquisition section 310 is also capable of acquiring a traffic pattern of data transmitted and received by the user device.

The traffic pattern means how much data (mainly user data) transmitted and received by the UE 100 are forwarded at what frequency, and in short can be indicated by a signal transmission rate (communication rate).

The anchor point selector 320 selects an anchor point of the UE 100 at a handover. Specifically, the anchor point selector 320 selects an anchor point out of multiple anchor points provided in the radio communication system 10.

As illustrated in FIG. 1, in this embodiment, the radio access network 20, specifically, the BSs 200 are provided with anchor points AL. The anchor points AL may be called local anchor points because they are close to the UE 100 side. In addition, the UP function 40 is provided with an anchor point AC. The anchor point AC may be called a central anchor point because it is provided on the core network side constituted by the UP function 40 and the like.

Note that the anchor points AL do not necessarily need to be provided on the BSs 200, but only need to be provided at a position close to the UE 100 side in terms of the network configuration in relation to the anchor point AC. Accordingly, an anchor point AL could be provided at the core network in some cases.

The anchor point selector 320 selects one of anchor points based on the user information acquired by the information acquisition section 310. Specifically, the anchor point selector 320 is capable of selecting an anchor point based on the mobility information on the UE 100. In addition, the anchor point selector 320 is capable of selecting an anchor point based on a traffic pattern of data transmitted and received by the UE 100.

Note that the anchor point selector 320 may be configured not to select any of anchor points when the user information acquired by the information acquisition section 310 satisfies a certain condition. In this case, instead of performing a handover (soft handover), the UE 100 once releases the connection of the data transmission route of the user information (U-plane) with the radio access network 20, and establishes again a new connection (hard handover) with the radio access network 20 or another radio access network.

Note that a specific method of selecting an anchor point will be further described later.

The anchor point notification section 330 notifies the UE 100 of the anchor point selected by the anchor point selector 320. Specifically, the anchor point notification section 330 is capable of notifying the UE 100 of the selected anchor point, using a control channel or a common data channel.

(3) Operation of Radio Communication System

Next, operation of the radio communication system 10 will be described. To put it specifically, descriptions will be provided for operation of the UE 100 performing a handover based on the anchor point selected by the ME 300 (anchor point control device).

(3.1) Communication Sequence

Figure 3:
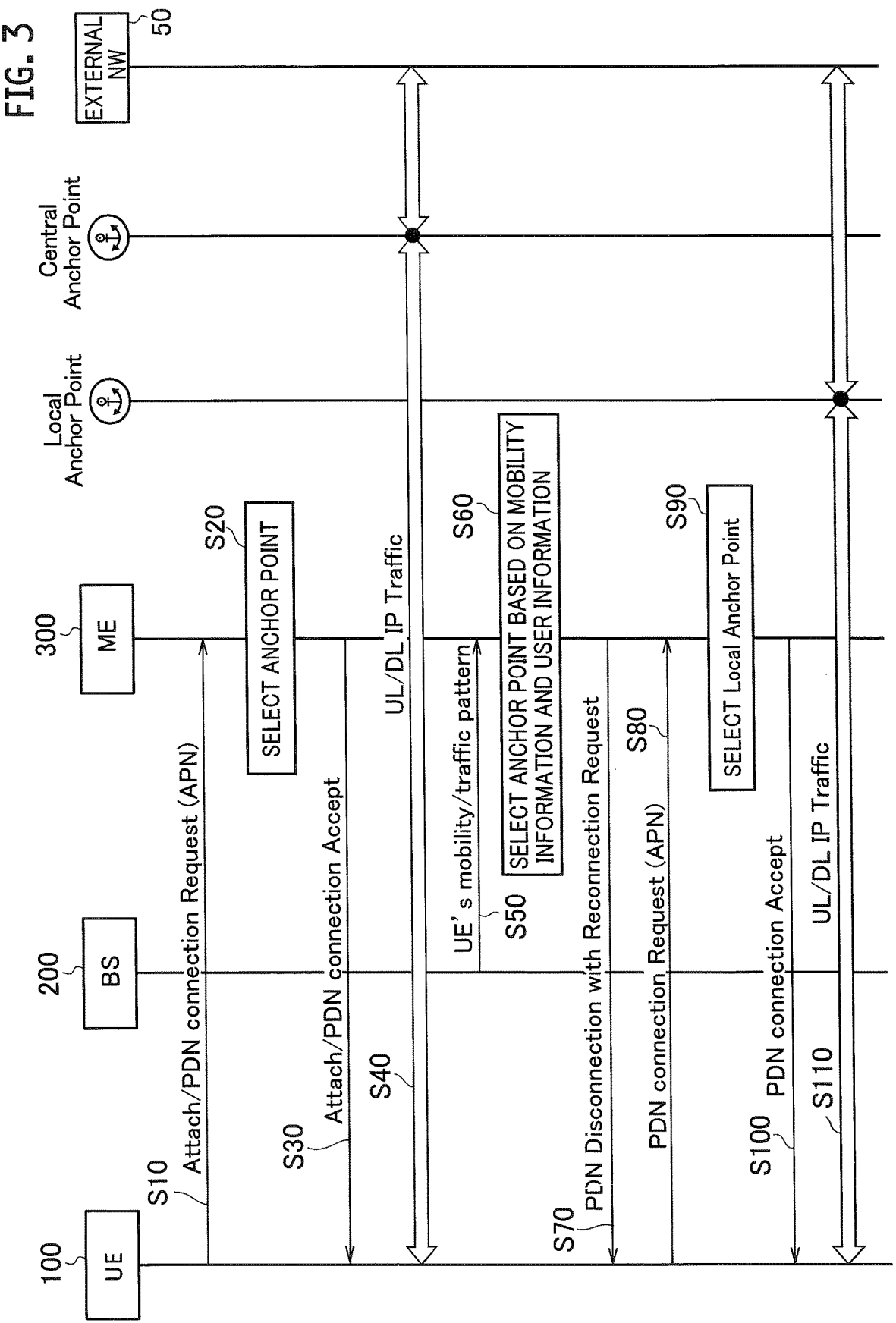
FIG. 3 is a diagram illustrating a communication sequence from UE 100 connecting to a network (PDN) until the completion of a handover.

FIG. 3 illustrates a communication sequence from the UE 100 connecting to the network (PDN) until the completion of a handover.

As illustrated in FIG. 3, the UE 100 transmits an Attach/PDN Connection Request (APN) to the ME 300 constituting the CP function 30, for requesting attachment to the radio access network 20 and connection to the external network 50 (specifically, Packet Data Network (PDN)) (S10).

The ME 300 selects an anchor point based on the user information included in the Attach/PDN Connection Request (APN), such as an Access Point Name (APN), the type of the APN (whether the APN supports a dynamic change of an anchor point), the type of the UE 100, and other information (S20). Here, it is assumed that a central anchor point (anchor point AC, see FIG. 1 and others) is selected.

The ME 300 transmits an Attach/PDN Connection Accept to the UE 100, which is a response to the Attach/PDN Connection Request (APN) (S30). The Attach/PDN Connection Accept includes information on the selected anchor point.

The UE 100 establishes a route to the external network 50 based on the contents of the Attach/PDN Connection Accept, and starts transmitting data (IP packets) in the uplink direction and receiving data (IP packets) in the downlink direction (S40). At this time, a central anchor point (anchor point AC) is set on this route.

In addition, the ME 300 starts acquiring the mobility information and the traffic pattern of the UE 100 (S50). Specifically, the ME 300 acquires the mobility information and the traffic pattern transmitted by the BS 200 (or SGW). Note that the mobility information and the traffic pattern described above are held as part of assistance information element of the core network (CN assistance information IE).

The ME 300 selects an anchor point to be applied at the next handover of the UE 100 based on the user information including the acquired mobility information and traffic pattern (S60). Here, it is assumed that the UE 100 does not move very frequently (the mobility is low).

As a result, the ME 300 changes the anchor point from the central anchor point (anchor point AC) to a local anchor point (an anchor point AL, see FIG. 1). In other words, in this timing, the ME 300 selects a local anchor point (anchor point AL).

Note that after the local anchor point is selected when the UE 100 further moves to an edge of the cell (coverage) formed by the BS 200 on which the local anchor point is set, the ME 300 can select a local anchor point (in other words, a BS 200) closer to the UE 100, depending on the movement of the UE 100. In addition, when changes of local anchor points occur very often, the ME 300 can also select a central anchor point, instead of selecting such a local anchor point.

The ME 300 transmits a PDN Disconnect with Reconnection Request to the UE 100 in order to change the anchor point applied at a handover of the UE 100 (S70).

The UE 100 transmits a PDN Connection Request (APN) to the ME 300 based on the contents of the PDN Disconnect with Reconnection Request (S80).

The ME 300 selects a local anchor point (anchor point AL) based on the selection result at step S60 (S90).

The ME 300 transmits a PDN Connection Accept to the UE 100, which is a response to the PDN Connection Request (APN) (S100). The PDN Connection Accept includes information on the selected anchor point.

The UE 100 establishes a route to the external network 50 based on the contents of the PDN Connection Accept, and starts transmitting data (IP packets) in the uplink direction or receiving data (IP packets) in the downlink direction (S110). At this time, a local anchor point (anchor point AL) is set on this route.

(3.2) Procedure for Selecting Anchor Point

Figure 4:
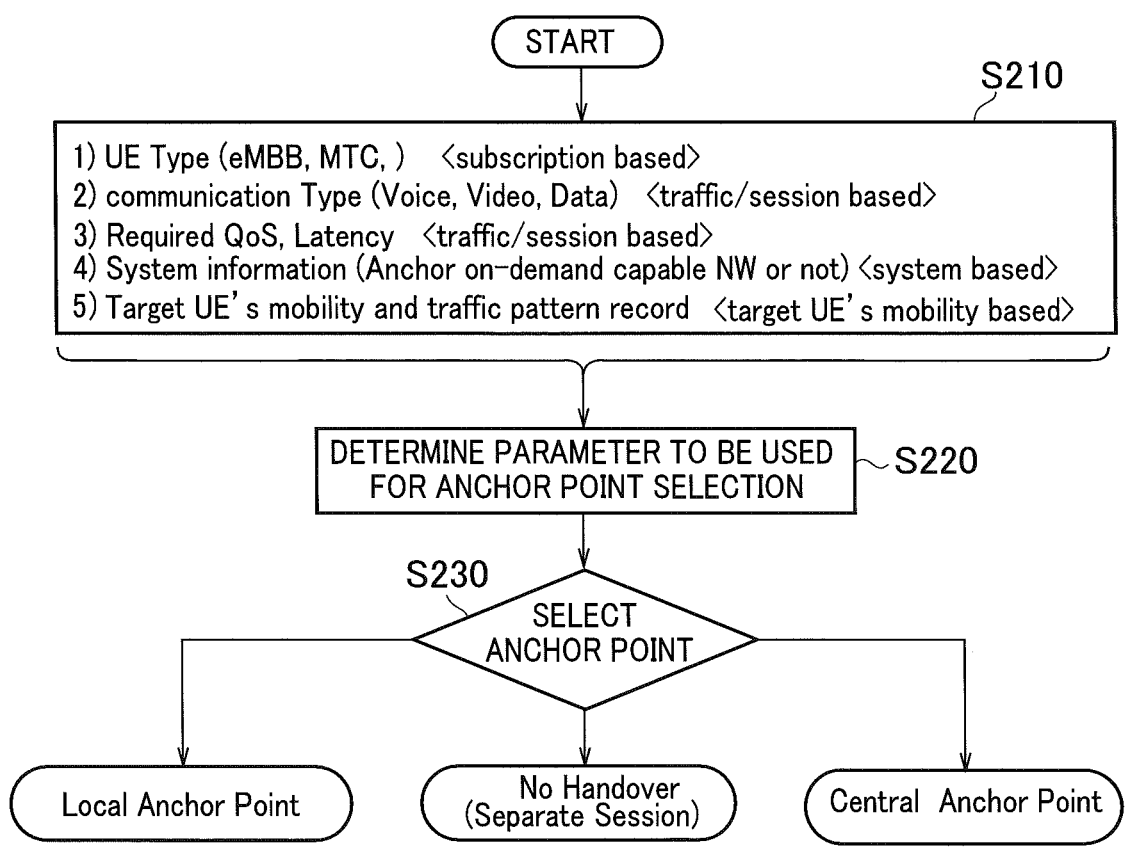
FIG. 4 is a diagram illustrating a procedure for the ME 300 selecting an anchor point.

FIG. 4 illustrates a procedure for the ME 300 selecting an anchor point. Specifically, FIG. 4 illustrates a concrete operation procedure of selecting an anchor point at steps S20 and S60 in FIG. 3 described above.

As illustrated in FIG. 4, the ME 300 acquires the user information indicating at least one of an attribute and a state of the UE 100 (S210). For example, the ME 300 is capable of acquiring the following information.

1) Type of the UE (eMBB (enhanced mobile broadband), MTC (Machine Type Communication))
2) Type of communication (Voice, Video, Data)
3) Required QoS and latency
4) System information (whether the network supports dynamic change of an anchor point)
5) Mobility and traffic pattern of the UE Note that <subscription based> means it is based on a contract with a network operator, and <traffic/session based> means it is based on a traffic or a session. In addition, <system based> means it is based on the type of the radio communication system (radio access network and core network) to which the UE 100 is connected, and <target UE's mobility based> means it is based on the mobility of the UE 100.

The ME 300 determines a parameter to be used for the selection of an anchor point based on the acquired user information (S220). Specifically, the ME 300 selects a parameter to be used for the selection of an anchor point out of the parameters included in the user information described above. Note that the number of selected parameters may be single or plural.

The ME 300 selects an anchor point based on the contents (values) of those selected parameters (S230). Specifically, the ME 300 selects any of the following.

Local anchor point

Central anchor point

No handover (reestablishment of a session)

Note that "No handover" means once releasing the connection (RRC_CONNECTED) to the radio access network 20 and establishing a new connection again (hard handover) with the radio access network 20 or another radio access network instead of performing a handover (soft handover) using a local anchor point or a central anchor point.

Or alternatively, the ME 300 may hold the number of handovers the UE 100 has performed, and select a local anchor point or a central anchor point depending on the number of those handovers.

Here, Tables 1 and 2 show examples of criteria to select an anchor point.

TABLE 1

| Type of H/O | Selection Criteria | Continuity of Session |
|---|---|---|
| No Handover | | No |
| Local Anchor Point | Low Latency, Lossless, Near UE | Yes |
| Central Anchor Point | Preservation of IP address and PGW/SGW | Yes (Lossless) |

TABLE 2

| Type of H/O | Mobility Low | Mobility High | Real-time Property Low | Real-time Property High |
|---|---|---|---|---|
| Local Anchor Point | x | | x | |
| Central Anchor Point | | x | | x |

As shown in Tables 1 and 2, as anchor point selection criteria, when low latency or lossless is required, if a preferable anchor point (BS 200) exists near the UE 100, the local anchor point can be selected. On the other hand, from the viewpoint of keeping the continuity of the session (route), a central anchor point is preferable because it allows for the preservation of the IP address and the like.

When the mobility of the UE 100 is low (for example, UE for IoT (MTC)), a local anchor point can be selected. On the other hand, when the mobility is high, a central anchor point is often preferable because it allows for the preservation of the IP address and the like as described above.

Note that the contents in Tables 1 and 2 are mere examples, and various criteria can be used to select an anchor point.

(3.3) Example of Switching Route at Handover

Next, descriptions will be provided for examples of switching a route at a handover using an anchor point described above.

Figure 5:
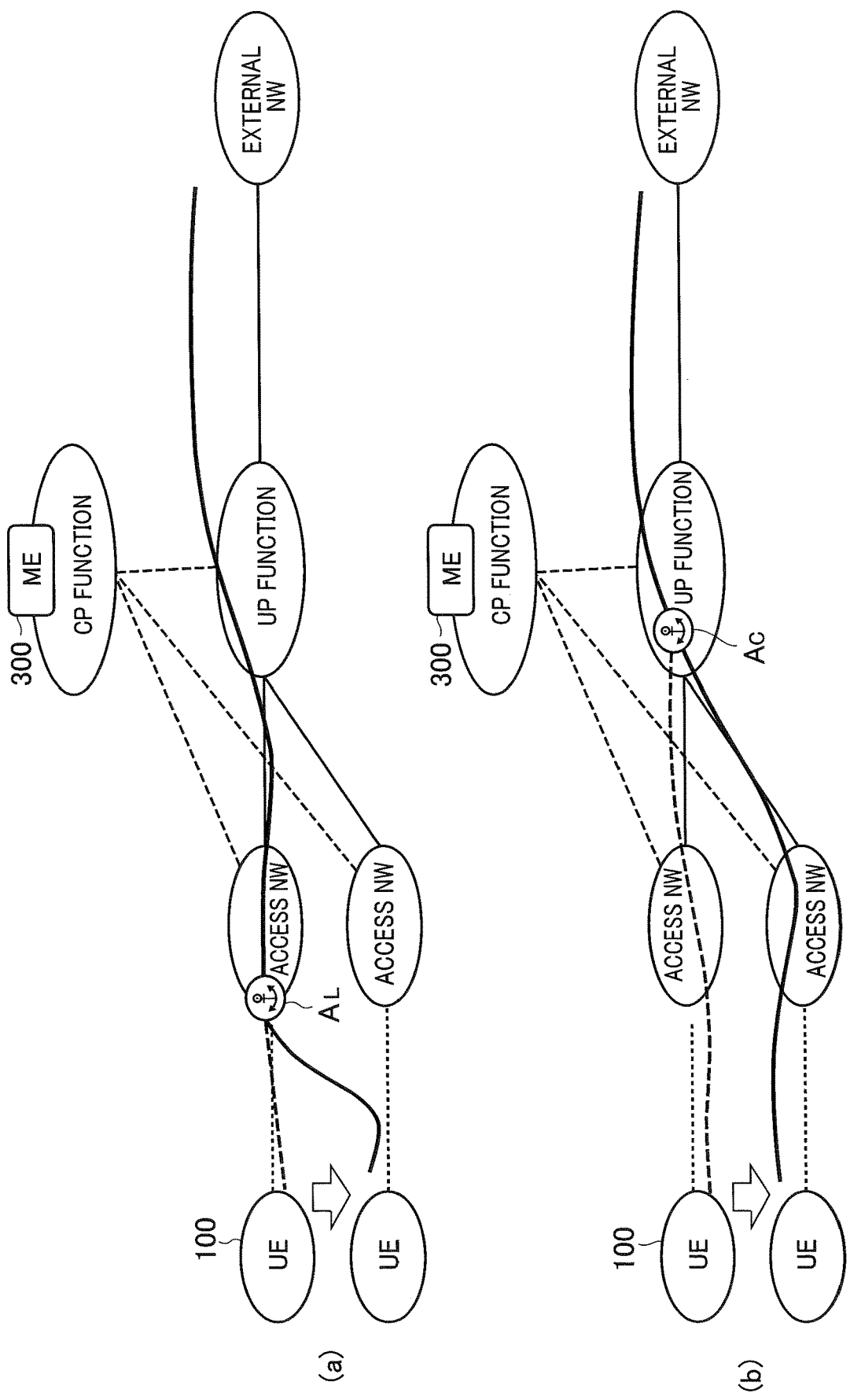
FIGS. 5(*a*) and 5(*b*) are diagrams illustrating an example 1 of switching a route at a handover using an anchor point.

FIGS. 5(*a*) and 5(*b*) illustrate an example 1 of switching a route at a handover using an anchor point.

Specifically, FIG. 5(*a*) illustrates routes before and after a handover using a local anchor point (anchor point AL). FIG. 5(*b*) illustrates routes before and after a handover using a central anchor point (anchor point AC). The routes (part of routes) before the handovers are shown by dotted lines, and the routes after the handovers are shown by solid lines.

As illustrated in FIG. 5(*a*), in the case of a handover using the anchor point AL, the route is switched only between the UE 100 and the radio access network 20 (specifically, at a BS 200). The route between the BS 200 and the external network 50 is the same before and after the handover. Accordingly, the ME 300 keeps the IP connection that has been established between the UE 100 and the core network and that is necessary when establishing a new route in the core network.

As illustrated in FIG. 5(*b*), in the case of the handover using the anchor point AC, the route is switched between the UE 100 and the UP function 40. It means that the radio access network 20 is also changed.

Figure 6:
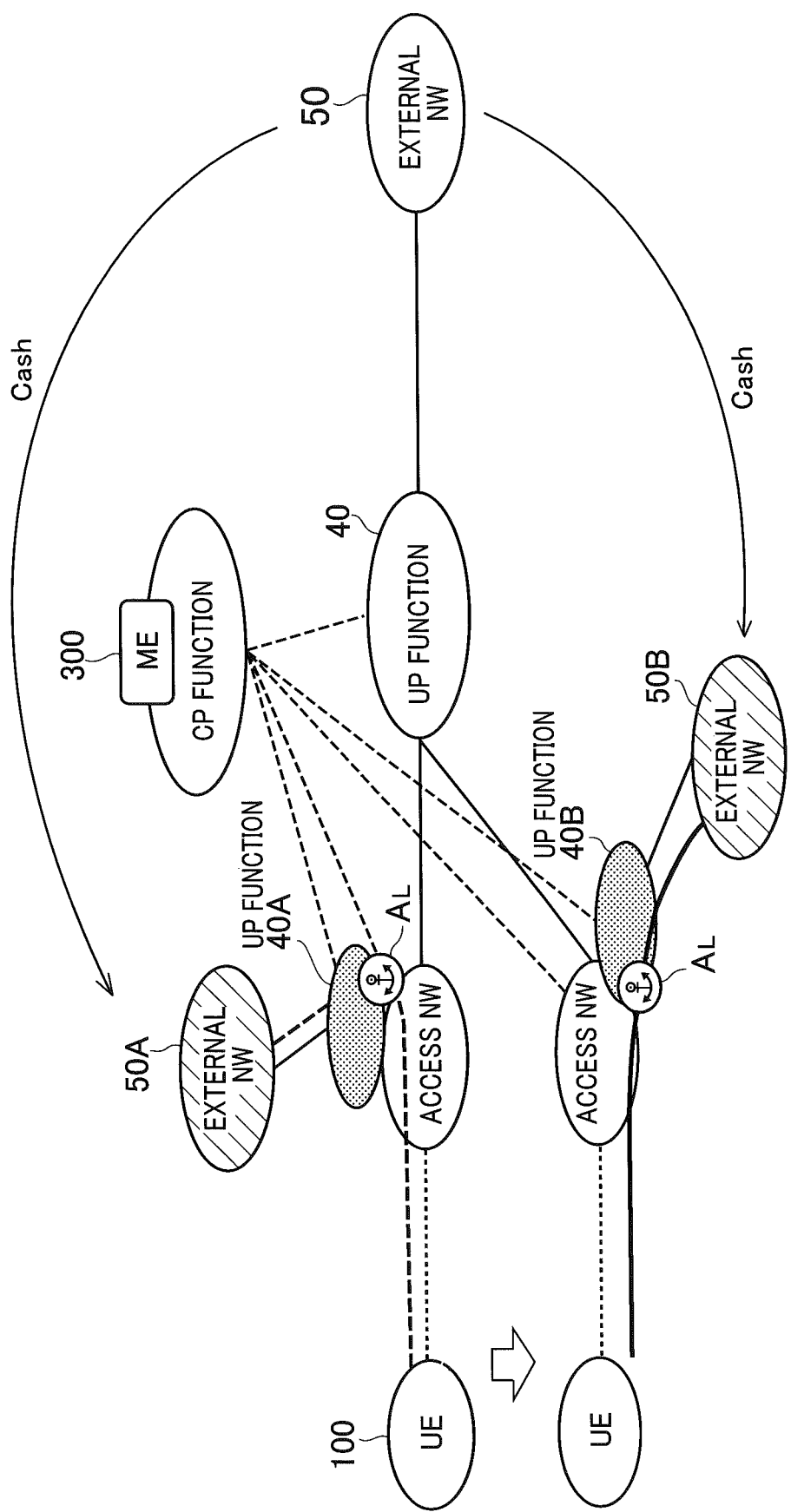
FIG. 6 is a diagram illustrating an example 2 of switching a route at a handover using an anchor point.

FIG. 6 illustrates an example 2 of switching a route at a handover using an anchor point. Specifically, as in FIG. 5(*a*), FIG. 6 illustrates routes before and after a handover using a local anchor point (anchor point AL). However, in FIG. 6, UP functions 40A and 40B, and external networks 50A and 50B are further provided on the radio access network 20 side.

The external networks 50A and 50B are virtual networks that cache part of the contents and other information held in a server or the like on the external network 50. Note that the UP functions 40A and 40B are not indispensable and a UP function does not need to be provided on the radio access network 20 side.

When the ME 300 finds, based on the type and the contents of the communications the UE 100 is performing, that the sufficient contents (for example, a video sharing site, an IoT local server, or the like) are cached in both external networks 50A and 50B, the ME 300 can instruct the UE 100 to perform a handover using the anchor points AL as illustrated in FIG. 6.

Note that as illustrated in FIG. 6, as a result of such a hand over, even though the anchor points AL are used, the anchor points AL used before and after the handover are switched.

(3.4) Modification Examples

Figure 7:
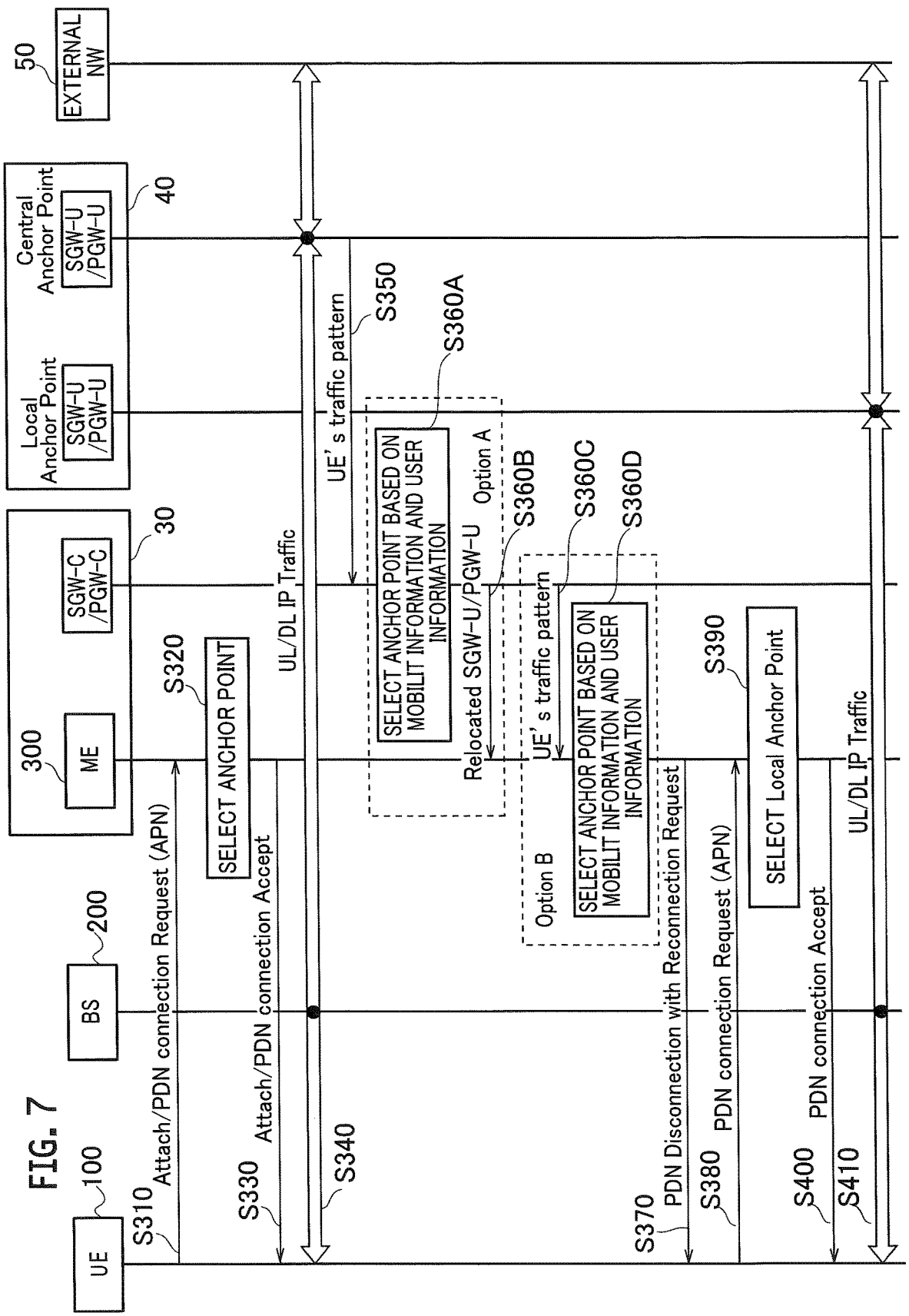
FIG. 7 is a diagram illustrating a communication sequence 1 from UE 100 connecting to a network (PDN) until the completion of a handover, according to a modification example.
Figure 8:
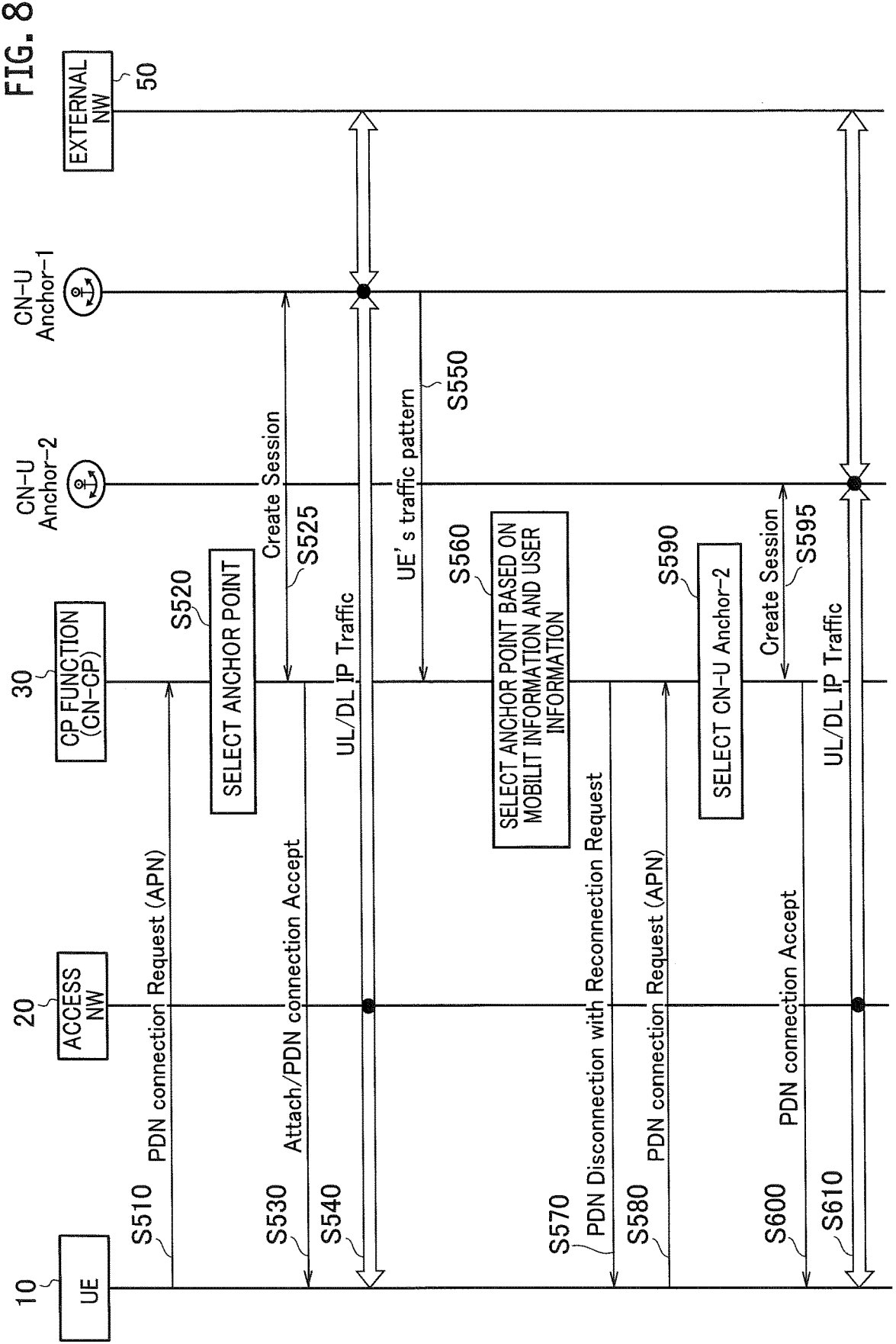
FIG. 8 is a diagram illustrating a communication sequence 2 from UE 100 connecting to a network (PDN) until the completion of a handover, according to another modification example.

Next, descriptions will be provided for modification examples of the communication sequence (see FIG. 3) described above. FIGS. 7 and 8 illustrate communication sequences according to the modification examples from the UE 100 connecting to the network (PDN) until the completion of a handover.

Specifically, in the modification example illustrated in FIG. 7, the SGW-C/PGW-C or the ME 300, constituting the CP function 30, selects an anchor point in the condition where the above-mentioned CUPS (C/U plane separation) is employed. Hereinafter, descriptions will mainly be provided for the difference from the communication sequence illustrated in FIG. 3.

Processing from step S310 to step S340 illustrated in FIG. 7 is almost the same as that from step S10 to step S40 illustrated in FIG. 3. However, in this modification example, a local anchor point and a central anchor point are provided in the SGW-U/PGW-U constituting the UP function 40.

In addition, in this modification example, the traffic pattern of the UE 100 is communicated not from the radio access network 20 but from the core network side.

The SGW-U/PGW-U constituting the UP function 40 transmits the traffic pattern of the UE 100 to the SGW-C/PGW-C constituting the CP function 30 (S350).

Here, in this modification example, either the SGW-C/PGW-C (option A) or the ME 300 (option B) selects an anchor point.

In the case of option A, the SGW-C/PGW-C selects an anchor point to be applied at the next handover of the UE 100 based on the mobility information on the UE 100 and the traffic pattern of the UE 100 received from the SGW-U/PGW-U (S360A). In other words, in the case of option A, the function as an anchor point control device is provided for the SGW-C/PGW-C.

Note that the mobility information is held as part of the assistance information element (CN assistance information IE) in the core network as described above.

Here, it is assumed that a local anchor point provided in the SGW-U/PGW-U is selected. As the local anchor point is selected, the SGW-C/PGW-C notifies the ME 300 of information on the SGW-U/PGW-U to which the local anchor point is provided, to relocate the SGW-U/PGW-U associated with the UE 100 (S360B).

On the other hand, in the case of option B, the SGW-C/PGW-C forwards the traffic pattern of the UE 100 received from the SGW-U/PGW-U to the ME 300 (S360C).

The ME 300 selects an anchor point to be applied at the next handover of the UE 100 based on the mobility information on the UE 100 and the traffic pattern of the UE 100 forwarded by the SGW-C/PGW-C(S360D).

Processing from step S370 to step S4100 illustrated in FIG. 7 is almost the same as the processing from step S70 to step S110 illustrated in FIG. 3.

In a modification example illustrated in FIG. 8, a CP function 30 into which the ME 300 and the SGW-C/PGW-C are integrated is provided. In this modification example, the CP function 30 may also be called a core network-control plane (CN-CP). As described above, this modification example is formed by scaling down the form in which the nodes such as the ME 300 and the SGW-C/PGW-C exist separately, and have a configuration in which a concept of the next generation system (NextGen) such as CUPS illustrated in FIG. 7 is further advanced.

In this modification example, multiple anchor points (Anchor-1, Anchor-2) are provided in a CN-U, that is, the user plane function (UP function 40) of the core network. Note that as the types (a local anchor point or a central anchor point) of Anchor-1 and Anchor-2, multiple anchor points may be provided at any setting places without particular limitation.

The UE 100 transmits a PDN Connection Request (APN) to the CP function 30 (CN-CP) (S510).

The CP function 30 (CN-CP) selects an anchor point based on an Access Point Name (APN) and the type of the APN included in the PDN Connection Request (APN), and the user information such as the type of the UE 100 and the mobility information thereon (S520). Here, it is assumed that the CN-U Anchor-1 is selected.

In addition, the CP function 30 (CN-CP) creates a session with the CN-U Anchor-1, and provides the CN-U Anchor-1 with a forwarding rule for the UE 100 (S525). Specifically, the CP function 30 (CN-CP) provides events related to the traffic of the UE 100, such as information on a server or an application that the UE 100 makes access to and information on IP addresses.

The CP function 30 (CN-CP) transmits a PDN Connection Accept to the UE 100, which is a response to the PDN Connection Request (APN) (S530).

The UE 100 establishes a route going through the CN-U Anchor-1 based on the contents of the PDN Connection Accept, and starts transmitting data (IP packets) in the uplink direction or receiving data (IP packets) in the downlink direction (S540).

In addition, in this modification example, the traffic pattern of the UE 100 is also communicated not from the radio access network 20 but from the core network (CN-U Anchor-1) side. Note that the traffic pattern communicated from the CN-U Anchor-1 may include information on a communication partner or a server accessed by the UE 100.

The CU-U Anchor-1 transmits the traffic pattern of the UE 100 to the CP function 30 (CN-CP) (S550).

The CP function 30 (CN-CP) selects an anchor point to be applied at the next handover of the UE 100 based on the mobility information of the UE 100 and the traffic pattern of the UE 100 forwarded from the UP function 40 (S560). Here, it is assumed that the CN-U Anchor-2 is selected.

Processing from step S570 to step S6100 illustrated in FIG. 8 is almost the same as the processing from step S70 to step S110 illustrated in FIG. 3. However, as with step S525 described above, the CP function 30 (CN-CP) creates a session with the CN-U Anchor-2, and provides the CN-U Anchor-2 with a forwarding rule for the UE 100 (S595).

(4) Advantageous Effect

According to the embodiments described above, the following advantageous effect can be obtained. Specifically, the ME 300 selects an anchor point out of multiple anchor points based on the user information on the UE 100, and communicates the selected anchor point to the UE 100. The UE 100 performs a handover using the communicated anchor point.

For this reason, it is possible to select an anchor point depending on the attribute and the state of the UE 100. This makes it possible to select a suitable anchor point when dynamically changing an anchor point.

More specifically, when a local anchor point is selected, it is possible to reduce the time necessary for a handover, which contributes to the reduction of necessary resources and processing loads at a handover on the core network side.

On the other hand, when a central anchor point is selected, it is possible to provide a high-quality handover (lossless) for UE 100 with a high mobility or UE 100 performing communications that require high real-time property (low latency).

As described above, selecting an anchor point depending on the attribute and the state of the UE 100 enables the provision of higher quality communication services while reducing the processing load on the core network side.

In this embodiment, the ME 300 selects an anchor point based on the mobility information indicating the mobility of the UE 100, and the traffic pattern of the UE 100. The mobility information and the traffic pattern are important factors when selecting one of a local anchor point and a central anchor point. Selecting an anchor point based on the mobility information and the traffic pattern makes it possible to select a more suitable anchor point.

(5) Other Embodiments

Although the details of the present invention have been disclosed along with the embodiments as above, the present invention is not limited to the above descriptions. It is apparent to those skilled in the art that various modifications and improvements thereto are possible.

For example, the block diagram used for explaining the above embodiments illustrates a functional block diagram. These functional blocks (constituent sections) are implemented by an arbitrary combination of hardware and/or software. In addition, the method of implementing each functional block is not particularly limited. In other words, functional blocks may be implemented either by a single device formed of physical and/or logical combinations, or by multiple devices formed by connecting directly and/or indirectly (for example with wires and/or wirelessly) two or more devices physically and/or logically separated.

Figure 9:
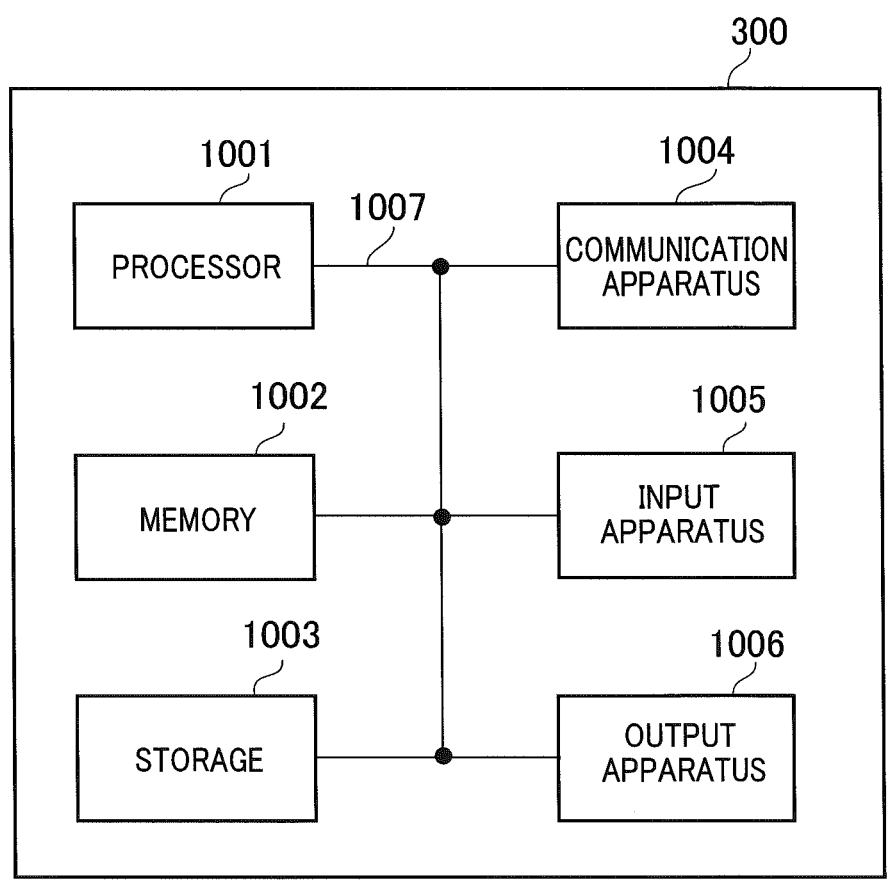
FIG. 9 is a diagram illustrating an example of a hardware structure of the ME 300.

Moreover, the ME 300 described above may function as a computer that performs processing of the radio communication method according to the present invention. FIG. 9 is a diagram illustrating an example of a hardware structure of the ME 300. As illustrated in FIG. 9, the ME 300 may be configured as a computer device including a processor 1001, a memory 1002, a storage 1003, a communication device 1004, an input device 1005, an output device 1006, a bus 1007, and the like.

The processor 1001, for example, controls the entire computer, running an operating system. The processor 1001 may be formed of a central processing unit (CPU) including an interface with peripheral devices, a control device, a computation device, a register, and the like.

The memory 1002 is a computer-readable recording medium, which may be formed of at least one of, for example, ROM (read only memory), EPROM (erasable programmable ROM), EEPROM (electrically erasable programmable ROM), RAM (random access memory), and the like. The memory 1002 may be called a register, a cache, a main memory, or the like. The memory 1002 is capable of storing a program (program codes), and a software module, and the like that can execute a method according to the embodiments described above.

The storage 1003 is a computer-readable recording medium, which may be formed of at least one of, for example, an optical disc such as a CD-ROM (Compact Disc ROM), a hard disk drive, a flexible disk, a magneto-optical disk (for example, a Compact Disc, a Digital Versatile Disc, a Blu-ray (registered trade mark) Disc), a smart card, a flash memory (for example, a card, a stick, a key drive), a floppy (registered trade mark) disk, a magnetic strip, and the like. The storage 1003 may be called an auxiliary storage device. The above described memory medium may be, for example, a database, a server, or another suitable medium including the memory 1002 and/or the storage 1003.

The communication device 1004 is hardware (a transmission reception device) for communication between computers via a wired and/or wireless network, and is also called, for example, a network device, a network controller, a network card, a communication module or the like.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. Note that the input device 1005 and the output device 1006 may be integrated into a single unit (for example, a touch panel).

In addition, the devices such as the processor 1001 and the memory 1002 are connected to each other with the bus 1007 to communicate information. The bus 1007 may be formed of a single bus or formed of multiple different buses depending on the devices.

In addition, the method of communicating information is not limited to the embodiments described above, but other methods can be used. For example, the communication of information may be implemented with physical layer signaling (for example, downlink control information (DCI), uplink control information (UCI)), upper layer signaling (for example, RRC signaling, medium access control (MAC) signaling, broadcast information (master information block (MIB)), system information block (SIB)), or other signals, or combinations of these. RRC signaling may be called an RRC message, and may be, for example, an RRC Connection Setup message, an RRC Connection Reconfiguration message, or the like.

Moreover, inputted or outputted information may be stored in a specific location (for example, a memory), or may be managed with a management table. Inputted or outputted information can be overwritten or updated, or additional information can be added to it. Outputted information may be deleted. Inputted information may be transferred to another device.

The sequences, flowcharts, and the like in the embodiments described above may be rearranged in order unless it causes a contradiction.

In addition, a certain operation performed by the ME 300 in the above-described embodiments is performed by another network node (device) in some cases. Moreover, the functions of the ME 300 may be provided by a combination of other multiple network nodes.

Note that the terms used in the descriptions of this specification and/or terms necessary to understand this specification may be replaced with terms having the same or similar meanings. For example, a channel and/or a symbol may be a signal, or a signal may be a message. In addition, the terms "system" and "network" may be used interchangeably.

Moreover, the above-described parameters and the like may be expressed by absolute values, by relative values from specified values, or by other associated information. For example, radio resources may be instructed by an index.

A BS 200 (base station) can accommodate one or more (for example, three) cells (also called sectors). When a base station has multiple cells, the entire coverage area of the base station can be divided into multiple smaller areas. Each smaller area can also provide communication services using a subsystem of the base station (for example, an indoor small base station RRH: remote radio head).

The term "cell" or "sector" means part or the whole of the coverage area provided by a base station and/or a subsystem of the base station that provide communication services in this coverage. Further, the terms "base station", "eNB", "cell", and "sector" can be used interchangeably in this specification. In some cases, a base station is also called terms such as a fixed station, a NodeB, an eNodeB (eNB), an access point, a femtocell, and a small cell.

The UE 100 is also called in some cases by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

"The expression "based on" used in this specification does not mean "based only on" unless explicitly stated otherwise. In other words, the expression "based on" means both "based only on" and "based at least on".

In addition, the terms "including", "comprising", and other variations thereof are intended to be comprehensive as with "comprise". Moreover, the term "or" used in this specification or the scope of claims is intended not to be exclusive disjunction.

Although the embodiments of the present invention have been described as above, it should not be understood that the descriptions and the drawings that constitute part of this disclosure limit the present invention. From this disclosure, various alternative embodiments, examples, and operation techniques will be easily found by those skilled in the art.

Note that the entire contents of Japanese Patent Application No. 2016-095118 (filed on May 11, 2016) are incorporated in this specification by reference.

INDUSTRIAL APPLICABILITY

The anchor point control device and the anchor point control method described above make it possible to select a more suitable anchor point when dynamically changing an anchor point.

REFERENCE SIGNS LIST 10 radio communication system
20 radio access network

30 CP function
40, 40A, 40B UP function
50, 50A, 50B external network
100 UE
200 BS
300 ME
310 information acquisition section
320 anchor point selector
330 anchor point notification section
1001 processor
1002 memory
1003 storage
1004 communication device
1005 input device
1006 output device
1007 bus

The invention claimed is:

1. An anchor point control device that controls a route switching point, which is a switching point of a route of user device at a handover, the anchor point control device comprising:
    a receiver that acquires user information indicating at least either an attribute or a state of the user device;
    an anchor point selector that selects a route switching point out of a plurality of route switching points based on the user information acquired by the receiver; and
    a transmitter that notifies the user device of the route switching point selected by the anchor point selector,
    wherein, after being selected by the anchor point selector, the selected route switching point establishes a session between the user device and a data network,
    wherein the receiver acquires mobility information indicating mobility of the user device, and
    wherein the anchor point selector selects either a user plane function in a core network or a radio base station included in a radio access network connected to the user plane function as the route switching point based on the mobility information.

2. The anchor point control device according to claim 1, wherein
    the receiver acquires a traffic pattern of data transmitted and received by the user device, and
    the anchor point selector selects the route switching point based on the traffic pattern.

3. An anchor point control method for a control device that controls a route switching point, which is a switching point of a route of user device at a handover, the anchor point control method comprising the steps of:
    selecting a route switching point by the control device out of a plurality of route switching points based on user information indicating at least either an attribute or a state of the user device;
    notifying the user device by the control device of the selected route switching point; and
    acquiring mobility information indicating mobility of the user device,
    wherein either a user plane function in a core network or a radio base station included in a radio access network connected to the user plane function is selected as the route switching point based on the mobility information, and
    wherein, after being selected by the control device, the selected route switching point establishes a session between the user device and a data network.

* * * * *